United States Patent Office 3,543,041
Patented Nov. 24, 1970

3,543,041
INSTALLATION FOR THE HYDRAULIC ACTUATION OF ADJUSTING MECHANISM IN VEHICLES, ESPECIALLY IN MOTOR VEHICLES
Werner Breitschwerdt, Stuttgart-Botnang, and Rudolf Andres, Sindelfingen, Germany, assignors to Daimler-Benz Aktiengesellschaft, Stuttgart-Unterturkheim, Germany
Filed June 12, 1968, Ser. No. 736,384
Claims priority, application Germany, June 14, 1967, 1,630,299
Int. Cl. E05f 15/08
U.S. Cl. 307—10　　　　　　　　　　　　　　　15 Claims

ABSTRACT OF THE DISCLOSURE

An installation for the hydraulic actuation of adjusting mechanisms in vehicles, especially in motor vehicles, in which the fluid pressure pump is driven by an electric motor; the latter is connected in an energizing circuit which includes a control relay, turning on and off the driving motor whereby the control relay, in turn, is controlled by electric switches, actuated by manual switches of the adjusting mechanisms as well as by the ignition switch and by a time-delay switch connected in parallel with the ignition switch.

---

The present invention relates to an installation provided with an electrically driven pump for the hydraulic actuation of adjusting mechanisms, in vehicles, especially in motor vehicles. According to the present invention, the pump is turned on only if a hydraulic manual switch coordinated to the adjusting mechanisms is actuated so that a discharge of the vehicle battery by the pump motor is impossible.

According to the present invention, electric switches actuated by the hydraulic manual switches as well as the mutually parallelly connected ignition switch and additional switch influenced by an operating magnitude of the vehicle engine are interconnected into the current energizing circuit of the relay turning on and off the pump drive motor. The advantage of this control circuit resides in that various protective switches or contacts can be dispensed with, which would otherwise be necessary in order to avoid with an internal or external leakage of the hydraulic installation an engagement of the driving motor for the pump which takes place either continuously or intermittently in brief intervals and therewith to load excessively the vehicle battery or even to discharge the same. The pump according to the present invention is therefore only engaged or turned on when an adjusting mechanism is to be loaded upon by the actuation of a hydraulic manual switch.

The electric switches that turn on and off the pump motor by way of a relay, are combined into a structural unit with the hydraulic manual switches. Additionally, the ignition switch and a further switch influenced by an operating magnitude of the vehicle engine are connected in mutually parallel connection into the current energizing circuit for the relay coordinated to the pump motor. On the one hand, it is achieved thereby that after removing the ignition key, the hydraulic installation is turned off or stopped. On the other hand, the possibility is created by the switch influenced by an operating magnitude of the vehicle engine and connected in parallel with the ignition switch to keep the hydraulic installation capable of operation for a certain period of time after turning off the vehicle in order to be able to actuate the vehicle parts controlled by the adjusting mechanisms. The last-mentioned switch or contactor can be constructed as thermal-lag switch or as pneumatically controlled switch whereby, in the first case, the disengagement or switching off is dependent on the temperature of the engine, of the cooling water or of the vehicle heating system whereas pneumatically controlled switches may be dependent, for example, on the suction pipe pressure of the engine.

Accordingly, it is an object of the present invention to provide an installation for the hydraulic actuation of adjusting mechanisms in vehicles, especially in motor vehicles, which is simple in construction, yet avoids the drawbacks and shortcomings encountered in the prior art.

Another object of the present invention resides in an installation for the hydraulic actuation of adjusting mechanisms in vehicles which reduces any unnecessary drain on the battery energizing the pump motor.

A further object of the present invention resides in an installation for the hydraulic actuation of adjusting mechanisms in vehicles, especially motor vehicles in which the pump is protected against excessive discharges as a result of continuous operation of the pump without the need of separate protective switches or contacts.

A still further object of the present invention resides in an installation for the hydraulic actuation of adjusting mechanisms of the type described above which protects the battery against continuous or periodically recurring loads as a result of leakages in the hydraulic installation.

Still another object of the present invention resides in an installation of the type described above which not only achieves all of the aforementioned aims and objects by extremely structurally simple means but additionally enables use of the actuating devices for a short period of time after the engine is turned off.

These and further objects, features, and advantages of the present invention will become more obvious from the following description when taken in connection with the accompanying drawing which shows, for purposes of illustration only, one embodiment in accordance with the present invention, and wherein.

Figure 1:
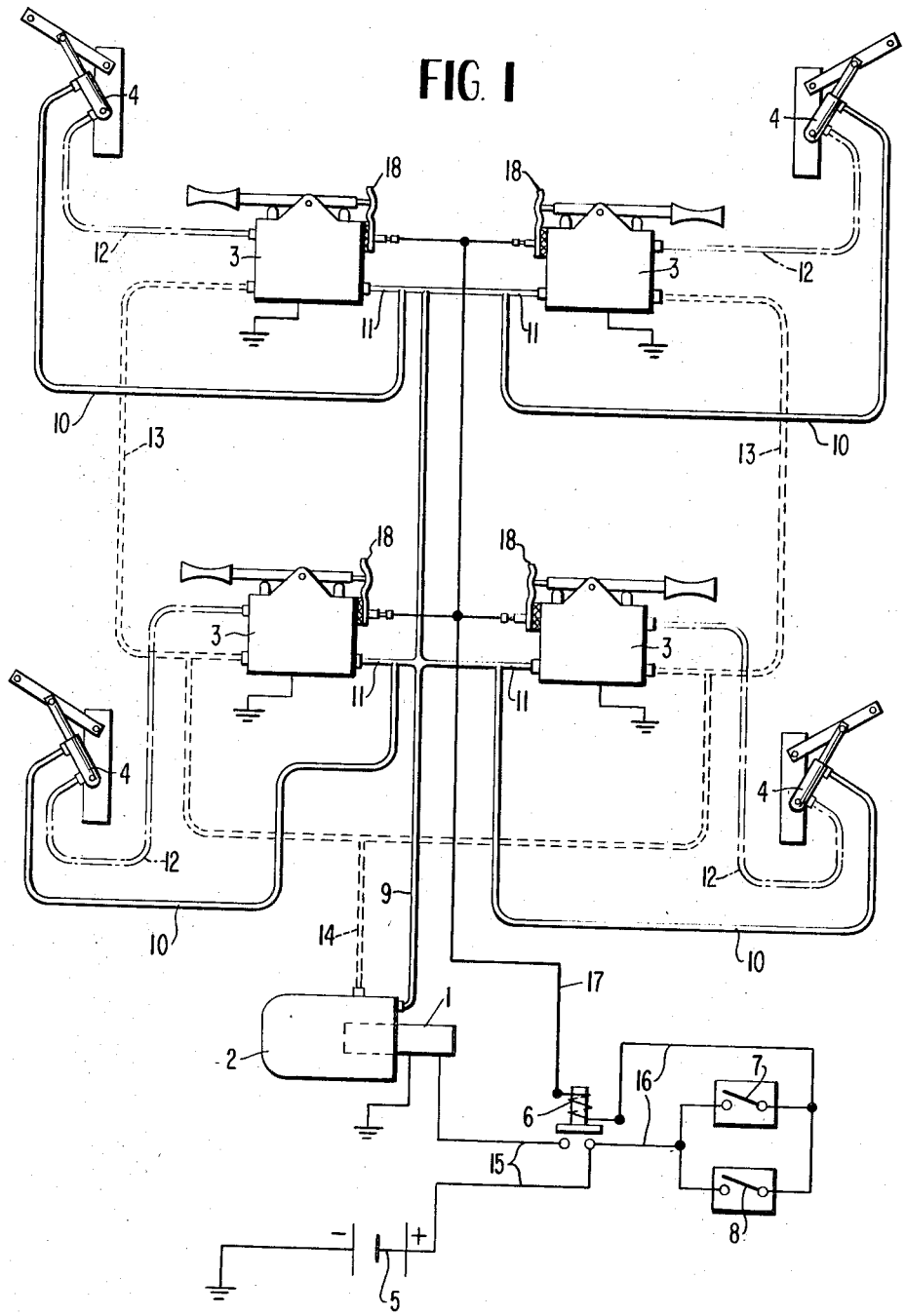
FIG. 1 is a schematic diagram of the installation according to the present invention for the hydraulic actuation of various adjusting mechanisms in a motor vehicle.
Figure 2:
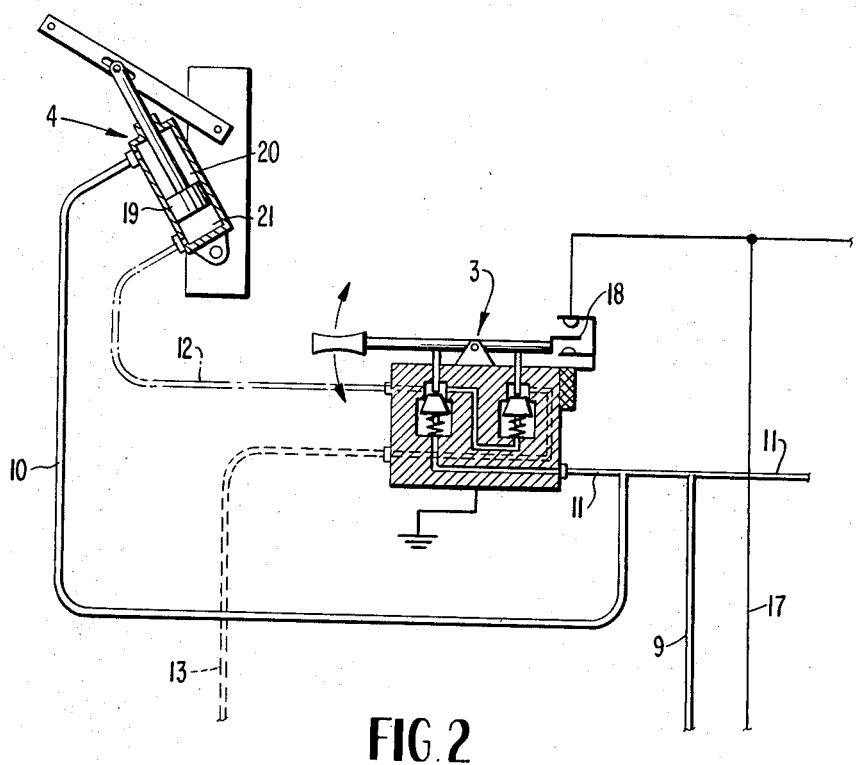
FIG. 2 is a somewhat schematic view, partly in cross section and on an enlarged scale of an individual adjusting mechanism with the associated hydraulic manual switch in accordance with the present invention.

Referring now to the drawing wherein like reference numerals are used throughout the various views to designate like parts, and more particularly to FIG. 1, hydraulic actuating mechanisms 4 of any conventional construction for the lifting and lowering, longitudinal displacement or tilting of movable parts such as, for example, vehicle seats, vehicle windows, or a vehicle sliding roof are mounted at corresponding places in a motor vehicle (not shown in the drawing). The fluid pressure necessary for the actuation of the adjusting mechanisms 4 is produced by a conventional pump 2 which is driven by an electric motor 1. The motor 1 energized from the vehicle battery 5 is combined into a structural unit with the pump 2 and with a fluid tank surrounding the same in a conventional manner. A hydraulic manual switch generally designated by reference numeral 3 is associated with each adjusting mechanism 4 (FIGS. 1 and 2) by means of which the advance and retraction of the working piston 19 is controlled. Electrical switches 18 which are connected mechanically with the hydraulic manual switches 3 are connected into the current energizing circuit 17 of the relay 6, turning on and off the pump drive motor 1. The ignition switch 7 and a switch 8 influenced by an operating magnitude of the vehicle engine are connected, parallel to each other, into the current energizing circuit branch 16 leading to the relay 6 and branched off from the current energizing circuit 15 for the pump motor 1. Both the pump motor 1 as well as the electric switches 18 structurally combined with the manual switches 3 are connected with one terminal thereof to ground.

A pressure line 9 leads from the pump 2 to the branch lines 11 of the manual switches 3 and additionally, lines 10 connected with branch lines 11, lead directly to the annular spaces 20 of the working pistons 19. Lines 12 lead from the manual switches 3 to the main spaces 21 of the adjusting mechanisms 4 which can be selectively and alternately connected by way of the manual switches 3 with the feed lines 11 and with the discharge lines 13. It should be noted that the effective piston area in space 21 is larger by the area of the piston rod than the effective piston area in space 20 so that piston 19 is operable, in effect, as a differential piston. The electrical switches 18 connected with the manual switches 3 are connected by way of an electric line 17 with the winding of the relay 6 for the pump motor 1.

OPERATION

The operation of the installation according to the present invention is as follows:

If it is assumed that, for example, one of the adjusting mechanisms 4 for the opening or closing of a vehicle window is to be actuated, then the lever of the associated manual switch 3 is pressed downwardly and therewith the electric switch 18 connected with the respective manual switch 3 is closed. Insofar as the ignition switch 7 is also closed, the coil of the relay 6 will be energized and will close the current energizing circuit 15 to the motor 1, and the pump 2 thereupon produces the pressure fluid necessary for the actuation of the adjusting mechanism 4, which pressure fluid then reaches the main space 21. When the desired window adjustment has been realized, the actuating lever of the manual switch 3 is again pivoted or released into the center position whereby the switch 18 opens and the coil of the relay 6 is de-energized. The pump motor 1 is thereby de-energized, i.e., comes to standstill, and the pump feed stops. During the upward movement of the manual switch lever, the electric switch 18 is again closed, and the main space 21 of the adjusting mechanism 4 is connected by way of the manual switch 3 with the discharge line 13 whereas the pressure fluid produced by the now re-energized pump 2 flows into the annular space 20. The pump feed stops as soon as the manual switch lever is in the center position and therewith the switch 18 is opened.

Figure 3:
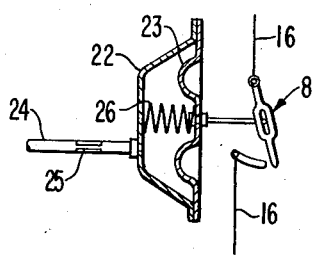
FIG. 3 is a cross-sectional view through a pneumatically actuated switch.

With a closed igition switch 7, this control circuit is maintained in readiness. However, if the ignition switch 7 is opened, then the pump 2 could no longer be turned on if a switch 8, influenced by an operating magnitude of the vehicle motor, were not connected in parallel to the ignition switch 7 which enables for a certain period of time the actuation of the adjusting mechanisms 4 after stoppage of the vehicle, i.e., after opening of the ignition switch 7. The switch 8 can be constructed as thermal switch or as pneumatic switch actuated, for example, by the pressure in the suction pipe of the engine. In the case of the instllation of a thermal-lag switch, the latter remains closed for such length of time until the vehicle engine or the cooling circulatory system thereof has cooled off. With the pneumatic switch 8 actuated, for example, in dependence on the suction pipe pressure, a diaphragm box 22 (FIG. 3) is present whose interior is connected by way of a line 24 with the suction pipe of the vehicle engine. The diaphragm 23 is drawn inwardly by the suction pipe pressure, and the switch 8 is closed thereby. If the vacuum ceases in the suction pipe, when turning off of the engine, then the diaphragm 23 will be gradually relieved and will eventually open the switch 8. A throttle 25 in the line 24 assures that this operation takes place very slowly so that after turning off the engine, sufficient time remains, for example, for the closing of the vehicle windows and of the sliding roof. A spring 26 assures the return of the diaphragm 23 after the disappearance of the vacuum in the suction pipe.

While we have shown and described only one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. An installation for the hydraulic actuation of adjusting mechanisms in vehicles, especially in motor vehicles having electrically driven pump means for producing pressure, wherein the improvement comprises circuit means, pump drive motor means connected in said circuit means, means in said circuit means operable to turn on and off said motor means including manual switch means for the adjusting mechanisms having electric contact means in said circuit means controlled by said manual switch means, ignition switch means connected to said circuit means, and additional switch means connected in parallel with said ignition switch means, said additional switch means being influenced by an operating magnitude of the vehicle engine to maintain energization of said circuit means for a time after opening of said ignition switch means to permit operation of said pump drive motor means by said manual switch means.

2. An installation according to claim 1, wherein the electric contact means are combined into a structural unit with the hydraulic manual switch means.

3. An installation according to claim 2, wherein the switch means influenced by an operating magnitude of the engine is constructed as thermal switch.

4. An installation according to claim 2, wherein the switch means influenced by an operating magnitude of the engine is constructed as pneumatically actuated switch.

5. An installation according to claim 4, further comprising means for actuating said pneumatically actuated switch by the pressure in the suction pipe of the engine.

6. An installation according to claim 1, wherein the switch means influenced by an operating magnitude of the engine is constructed as thermal switch.

7. An installation according to claim 1, wherein the switch means influenced by an operating magnitude of the engine is constructed as pneumatically actuated switch.

8. An installation according to claim 7, further comprising means for actuating said pneumatically actuated switch by the pressure in the suction pipe of the engine.

9. An installation for the hydraulic actuation of adjusting mechanisms in vehicles, especially in motor vehicles, comprising an electrically driven pump, a pump drive motor, energizing circuit means for said motor including normally open relay means operable to turn on and off said motor, and control means operatively connected with said relay means for controlling the latter including manually operated switch means, ignition switch means, and further means responsive to an operating condition of the vehicle engine for enabling temporary energization of said relay means even with an open ignition switch means.

10. An installation according to claim 9, wherein said further means includes time-delay switch means in parallel with said ignition switch means.

11. An installation according to claim 9, wherein the manually operated switch means include manually operated hydraulic switch means and electric switch means combined into a structural unit.

12. An installation according to claim 11, wherein said further means includes time-delay switch means in parallel with said ignition switch means.

13. An installation according to claim 9, wherein the further means is a thermally operated switch means operated by a control magnitude reflecting engine temperature.

14. An installation according to claim 9, wherein the further means is a pneumatically actuated switch means.

15. An installation according to claim 14, further comprising means for actuating said pneumatically actuated switch means by the pressure in the suction pipe of the engine.

References Cited

UNITED STATES PATENTS

| | | | |
|---|---|---|---|
| 2,751,507 | 6/1956 | Crum | 307—10 |
| 2,911,212 | 11/1959 | Förster | 49—349 X |
| 3,044,823 | 7/1962 | Oishei et al. | 49—349 X |
| 3,223,404 | 12/1965 | Nallinger | 49—349 |

ROBERT K. SCHAEFER, Primary Examiner

T. B. JOIKE, Assistant Examiner

U.S. Cl. X.R.

49—349